Figure 1:
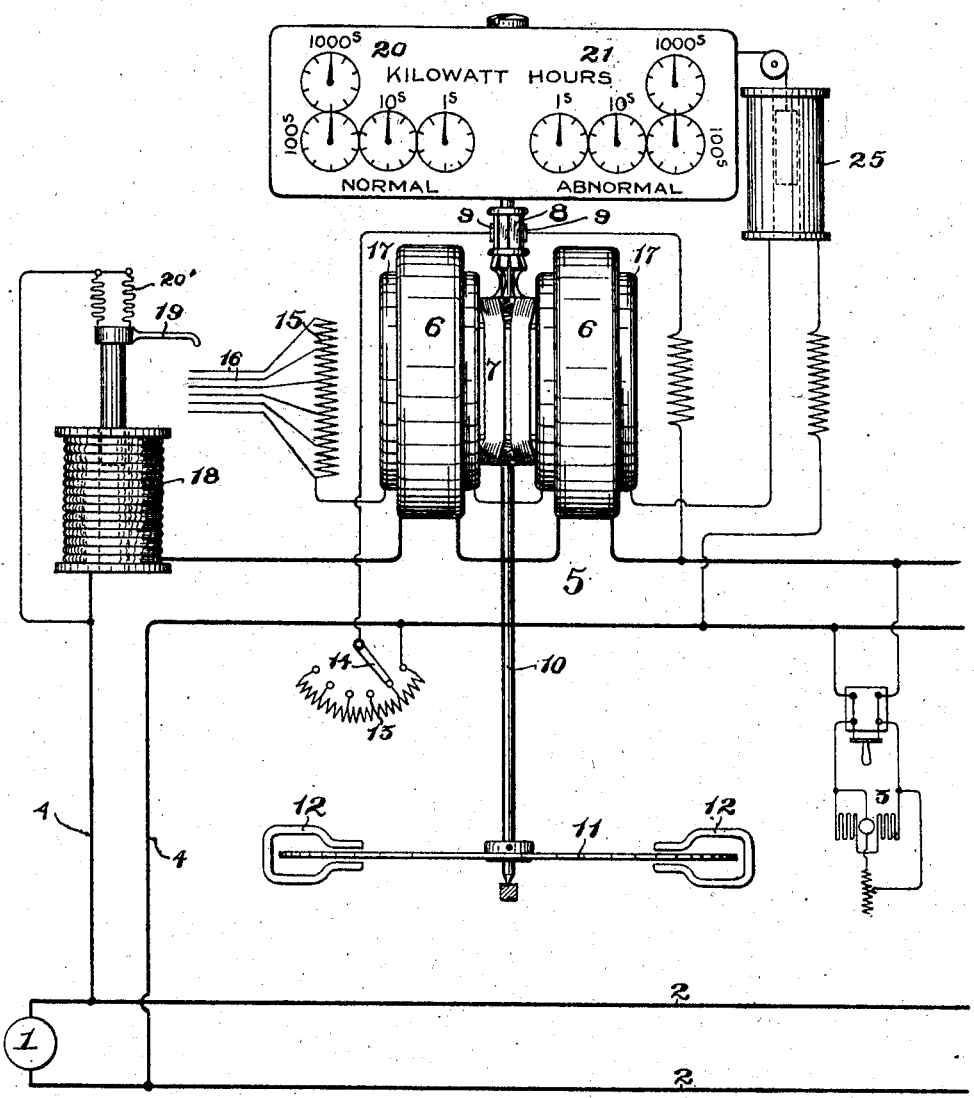

No. 796,037. PATENTED AUG. 1, 1905.
T. DUNCAN.
ELECTRIC METER.
APPLICATION FILED JULY 11, 1901.

2 SHEETS—SHEET 1.

WITNESSES:
May W. Gabel.
Harvey L. Hanson.

INVENTOR:
Thomas Duncan
BY Charles A. Brown Cragg & Belfield
ATTORNEYS.

No. 796,037. PATENTED AUG. 1, 1905.
T. DUNCAN.
ELECTRIC METER.
APPLICATION FILED JULY 11, 1901.

2 SHEETS—SHEET 2.

WITNESSES: INVENTOR.
Thomas Duncan
By Charles A. Brown
Cragg & Belfield
ATTORNEYS.

UNITED STATES PATENT OFFICE.

THOMAS DUNCAN, OF CHICAGO, ILLINOIS.

ELECTRIC METER.

No. 796,037.  Specification of Letters Patent.  Patented Aug. 1, 1905.

Application filed July 11, 1901. Serial No. 67,813.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to electric meters for measuring the power in systems of electrical distribution.

In a copending application, Serial No. 66,954, filed July 3, 1901, I have disclosed a meter that has as its salient features, first, the provision of step-by-step adjusting means whereby the rate of operation of the meter for a given load may be varied, whereby the meter may be caused to totalize at a rate according to the price agreed upon with the consumer, the meter thus constituting a prediscount-meter; second, the provision of automatically-operated means for governing the rate of operation of the meter, whereby the meter may be caused to operate at different rates of speed according to the load, whereby the consumer may be charged at an increased rate for current that is intermittently consumed above a normal maximum, this automatically-operated means preferably including a graded or step-by-step device for effecting a step-by-step increase in the torque of the meter—that is, as the excess in load increases the normal torque is correspondingly increased to produce a rate of registration per unit of energy or load of the meter that is greater than that which would exist if the current being measured were within normal limits; third, means whereby the consumer may be informed of the current consumed in excess of the normal maximum and means also for determining the amount of current consumed within the normal limits.

Various consumers may be allowed different rates of discount—that is, the meters when provided with scales indicating kilowatt-hours or other measuring units may be caused to register different amounts for a given quantity of current, which is a way of affording consumers their respective discounts.

I am enabled to have the operation of the meter adjusted in a manner to have the meter indicate that which the consumer is to be charged for. The reading-scale may, if desired, be marked to indicate the kilowatt-hours, the adjusting means being provided to produce an operation of the counting-train of the instrument that need not necessarily indicate the exact energy or load, but the quantity of energy or load that the consumer is to be charged for, the reading indicating the total actual power consumed less the prearranged discount. For example, the meters may be equipped with step-by-step adjusting devices providing for five, ten, fifteen, twenty, and twenty-five per cent. discount. One consumer may not be given any discount. His meter will then indicate the true reading in kilowatt-hours of the energy consumed. Another consumer may be given five per cent. discount. Supposing that he has consumed one thousand kilowatt-hours, his instrument will indicate a charge for nine hundred and fifty kilowatt-hours. Another consumer who uses ten thousand or more kilowatt-hours may be given ten per cent. discount, and for the ten thousand kilowatt-hours consumed his meter will indicate a charge for nine thousand kilowatt-hours. By this arrangement the keeping of accounts is greatly simplified, as the consumers are charged according to the readings of their meters, each instrument then taking cognizance of the particular consumer's discount.

In my said copending application I have provided a rheostat and automatic means for cutting the resistance thereof out of circuit with the armature of the meter as the current in the working circuit increases above the normal maximum, whereby the rate of registration per unit of energy or load is increased whenever the load upon the system is increased above the normal maximum. This feature is of particular utility in systems where motors that are frequently started are used—as, for example, in hoisting—where the consumer obviously should be charged in excess of the normal rate where excessive demands are intermittently made upon the system.

In the said copending application I have included a prediscount resistance in series with the rate-changing rheostat and the meter-armature, the prediscount resistance serving to effect a fixed percentage reduction in the rate of registration of the instrument in accordance with the discount the consumer is to receive from the charge for the power supplied to him. In my present application I include the discount resistance in circuit with the armature alone, while the rate-changing resistance or rheostat is included in circuit with a field-winding which is preferably an auxiliary field-winding, circuit through which is completed each time the current exceeds the normal maximum.

In my said copending application I have provided two counting mechanisms, one for recording the power consumed when the current is within normal limits and the other for recording the power consumed when the current exceeds the normal limits, and have provided the said counting mechanisms with a rocking frame-carrying gearing, which is swung into engagement with one counting-train or the other through the agency of an electromagnet that is operatively energized each time the current exceeds the predetermined normal maximum, this gearing being in engagement with the rotating element or shaft of the meter.

In my present invention I employ a reciprocating adjustment, the shaft of the meter being preferably swung into engagement with one counting-train or the other. An electromagnet is provided for shifting the shaft into engagement with that counting-train, the abnormal counting-train, that records the power consumed when the current is above the normal maximum. This electromagnet is preferably in series with the rate-changing rheostat or resistance and the supplemental field-winding whose magnetizing influence is controlled by the rate-changing resistance.

I will explain my invention more fully by reference to the accompanying drawings, in which—

Figure 2:
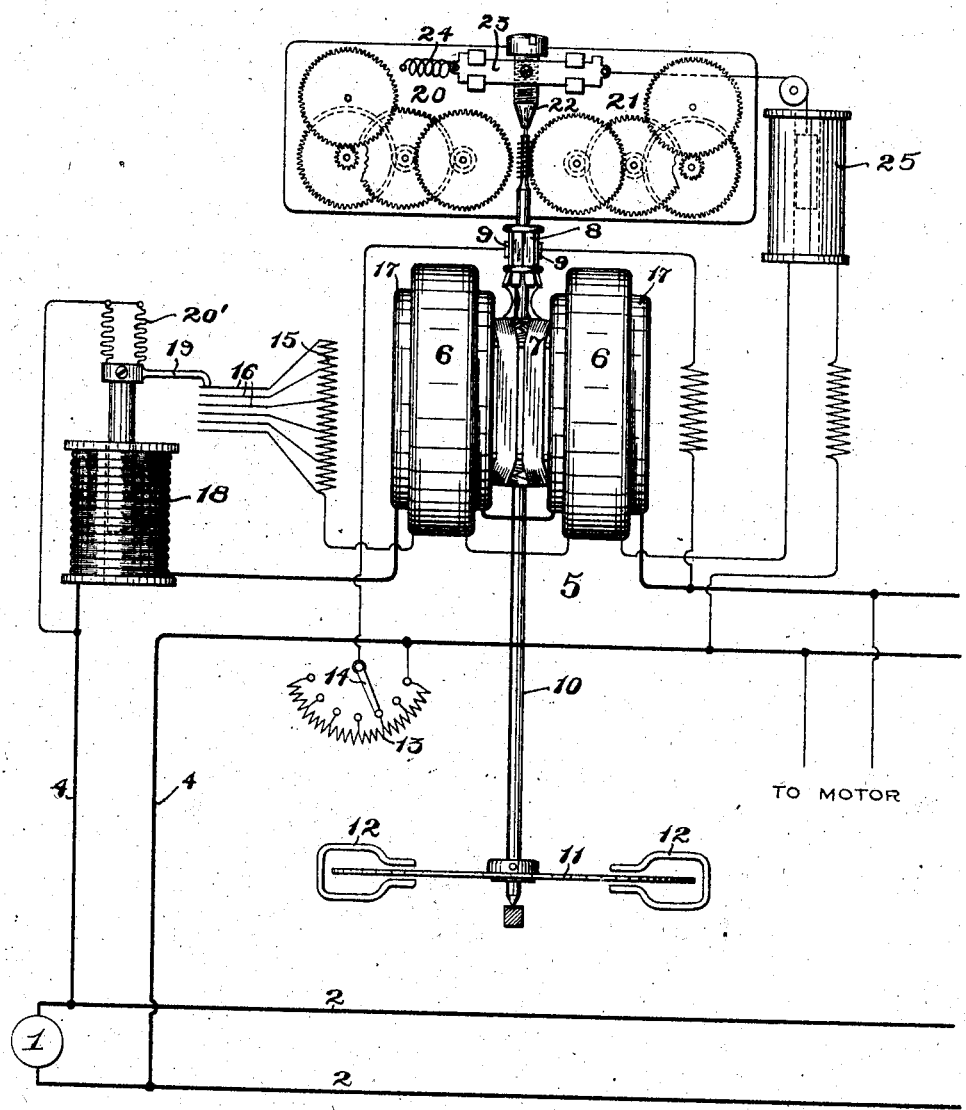

Figure 1 illustrates a system of direct-current distribution, the meter being diagrammatically indicated in elevation. Fig. 2 is also a view of a system of direct-current distribution, the counting-train being illustrated in detail, the dial-plate being removed.

Like parts are indicated by similar characters of reference throughout the figures.

I have illustrated a system of direct-current distribution and a commutated motor-meter; but the invention is equally applicable to other systems of electrical distribution and to meters of other forms.

In Figs. 1 and 2 the generator 1 supplies current to the transmission-mains 2 2. These mains convey current to translating devices, such as motors, a motor 3 of well-known type being illustrated in Fig. 1, this motor being connected in circuit with supply-conductors 4 4. A meter 5 is associated with the consumer's supply-circuit 4 4, the meter in this instance employing a field-winding divided into coils 6 6, in series with one of the conductors 4, and an armature 7, in bridge between the mains 4 4, a commutator 8, with brushes 9 9, being provided for including the armature in circuit. The armature is mounted upon a shaft 10, at the lower part of which is a damping-disk 11, arranged within the fields of the permanent magnets 12 12 to secure requisite damping effect.

In order to adjust the torque of the meter to conform to the prearranged cost of the current, I preferably include a resistance 13, that may be termed a "discount" resistance, in series with the armature, this resistance being provided with a plurality of discount-buttons that may be suitably marked to indicate various discounts. A switch-arm 14 may be swung into engagement with any of the buttons to include more or less of the resistance 13 in circuit with the armature. This feature of the apparatus is fully set forth in my copending application, and I will not, therefore, describe it further. The meter is also provided with a torque-adjusting resistance 15, divided into sections having terminal contacts 16. This resistance is designed to be altogether included preferably in series with the supplemental field-winding divided into coils 17 during the presence of normal current in the system. As the current in the system is increased beyond the normal maximum, this resistance 15 is cut out of circuit step by step. By means to be presently set forth the total resistance 15 is cut into circuit when the current exceeds the normal maximum, the resistance decreasing in amount as the current increases beyond the normal maximum, the said resistance being totally removed from the circuit when the current in the system is below the normal maximum. The auxiliary winding 17, being in series with the resistance 15, is also removed from circuit when the current in the system is below the normal maximum. When this resistance is cut into circuit, the coils 17 establish another field, thereby increasing the torque of the instrument and effecting a corresponding increase in the rate of registration per unit of energy or load.

The means that I preferably employ for cutting the resistance 15 into circuit and decreasing the amount thereof subsequently consists of a solenoid or electromagnet 18, that is included in series with the translating means 3, the core of the solenoid being provided with an arm 19, that forces the spring-terminals 16 together as the core of the solenoid is drawn into the helix thereof, the attraction of the helix of the solenoid for its core increasing as the abnormal current within the distribution-circuit increases. The arm 19 is connected with one of the transmission-mains, while the resistance 15 and the auxiliary coils 17 are connected with the other main, so that as soon as this arm is drawn into contact with one of the terminal springs 16 circuit through the resistance and the supplemental field-coils 17 is closed. For example, if the meter 3 is designed to operate normally when the current remains within the normal maximum of one hundred amperes and if the current exceeds this value by five per cent. the core of the solenoid will be drawn sufficiently within its helix to bring the two upper resistance-terminals 16 into contact, thereby cutting out the first section of the resistance 15 and causing an increase of five per cent. in the normal torque of the meter, whereby the rate of registration per unit of energy or load is increased. If the current in the distribution-circuit should increase seven and one-half per cent. above this normal, then the three upper resistance-terminals 16 are brought into contact upon the further attraction of the solenoid-core, whereby the two upper sections of the resistance 15 are short-circuited and an increase of ten per cent. in the normal torque of the meter effected. Thus the sections of the resistance 15 are successively cut out or shunted out of circuit as the current increases above the maximum, thereby increasing the strength of the field, due to the auxiliary winding 17, and correspondingly increasing the torque of the meter. The core of the solenoid is preferably adjusted, by means of springs 20', to prevent the same from being drawn within the solenoid-helix while normal current only is present upon the line.

I prefer to record the excess rate upon a different counting mechanism, and on this account I provide each meter with two counting-trains 20 and 21, the counting-train 20 constituting the normal counting-train, while the counting-train 21 constitutes the abnormal counting-train. To effect this alternate engagement of the rotating element or shaft of the meter with one or the other of the counting-trains, I provide the upper end of the shaft with a worm-thread that is adapted for engagement with a wheel of one or the other of the counting-trains. I mount the upper bearing 22 of the shaft in a sliding or reciprocating support 23, which is moved to one of its extreme positions by a spring 24 when the current in the system is within the normal limits. The sliding support is connected with the core or armature of the solenoid or electromagnet 25, the helix of said magnet being in series with the resistance 15 and auxiliary field-coils 17. When the current in the system exceeds the normal maximum, the sliding support 23 is moved toward the right against the force of the spring 24, whereby the upper bearing of the armature-shaft is moved to bring the shaft that was previously in engagement with the normal counting-train upon the left into engagement with the abnormal counting-train upon the right.

While I have herein shown and particularly described the preferred embodiment of my invention, it is obvious that changes may readily be made without departing from the spirit thereof, and I do not, therefore, wish to be limited to the precise disclosure herein set forth; but,

Having thus described my invention, I claim as new and desire to secure by Letters Patent—

1. The combination with a system of electrical distribution, of a meter receiving current therefrom, normal and abnormal counting mechanisms, a rotating element of the meter provided with a thread adapted for engagement with one or the other of the counting-trains of said mechanisms, the said rotating element being provided with a bearing, a reciprocating support for the said bearing, means for normally maintaining the said support in one position to engage the rotating element of the meter with the normal counting-train, an electromagnetic mechanism serving when energized to move the said rotating element into engagement with the counting-train of the abnormal counting mechanism, a switch for energizing the said electromagnetic mechanism, and electromagnetic means for operating the said switch when the current in the system exceeds the normal maximum, substantially as described.

2. The combination with a system of electrical distribution, of a meter receiving current therefrom, normal and abnormal counting mechanisms, a rotating element of the meter provided with a thread adapted for engagement with one or the other of the counting-trains of said mechanisms, the said rotating element being provided with a bearing, a reciprocating support for the said bearing, means for normally maintaining the said support in one position to engage the rotating element of the meter with the normal counting-train, an electromagnetic mechanism serving when energized to move the said rotating element into engagement with the counting-train of the abnormal counting mechanism, a switch for energizing the said electromagnetic mechanism, electromagnetic means for operating the said switch when the current in the system exceeds the normal maximum, and means whereby the latter electromagnet is prevented from operating the switch controlled thereby until the current exceeds the normal maximum, substantially as described.

3. The combination with a system of electrical distribution, of a meter receiving current therefrom, normal and abnormal counting mechanisms, a rotating element of the meter adapted for operative engagement with one or the other of the said counting mechanisms, automatically-operated means for shifting the said rotating element into engagement with one or the other of the said counting mechanisms, and means whereby the rotating element is prevented from being shifted from engagement with the normal counting mechanism until the current in the system exceeds the normal maximum, substantially as described.

4. The combination with a system of electrical distribution, of a meter connected therewith, a supplemental field-winding for the said meter, means for varying the magnetizing effect of the auxiliary field-winding, and electromagnetic means governed by the current of the system governing the aforesaid means and serving to increase the magnetizing effect due to the said auxiliary field-winding upon an increase in the current of the system, substantially as described.

5. The combination with a system of electrical distribution, of a meter connected therewith, a supplemental field-winding for the said meter, means for varying the magnetizing effect of the auxiliary field-winding, electromagnetic means governing the aforesaid means and serving to increase the magnetizing effect due to the said auxiliary field-winding upon an increase in the current of the system, and means whereby the said electromagnet is prevented from operating until the current within the system exceeds a predetermined normal maximum, substantially as described.

6. The combination with a system of electrical distribution, of a meter connected therewith, a supplemental field-winding for the said meter, a rheostat, a switch, an electromagnetic mechanism for operating the switch to include the said rheostat in circuit with the auxiliary field-winding and thereby adjust the magnetizing effect thereof, the said electromagnetic mechanism serving to exclude portions of the resistance from circuit with the auxiliary field-winding as the energization of the said electromagnetic mechanism is increased, whereby the torque of the meter is increased as the current in the circuit is increased to produce an increased rate of registration by the meter, substantially as described.

7. The combination with a system of electrical distribution, of a meter connected therewith, a supplemental field-winding for the said meter, a rheostat, a switch, an electromagnetic mechanism for operating the switch to include the said rheostat in circuit with the auxiliary field-winding and thereby adjust the magnetizing effect thereof, the said electromagnetic mechanism serving to exclude portions of the resistance from circuit with the auxiliary field-winding as the energization of the said magnet is increased, whereby the torque of the meter is increased as the current in the circuit is increased to produce an increased rate of registration by the meter, and means whereby the said electromagnet is prevented from operating until the current in the system has increased beyond the predetermined normal maximum, substantially as described.

8. In an electric meter, the combination with normal and abnormal counting mechanisms, of a rotating element of a meter adapted for operative engagement with one or the other of the said counting mechanisms, automatically-operated means for shifting the said rotating element into engagement with one or the other of said counting mechanisms, and means whereby the rotating element is prevented from being shifted from engagement with the normal counting mechanism until the current in the system exceeds the normal value, substantially as described.

9. In an electric meter, the combination with a supplemental field-winding for said meter, of means for varying the magnetizing effect of the supplemental field-winding, and electromagnetic means governing the aforesaid means and serving to increase the magnetizing effect due to the said auxiliary field-winding upon an increase in the current of the system, substantially as described.

10. In an electric meter, the combination with a supplemental field-winding for the said meter, of means for varying the magnetizing effect of the auxiliary field-winding, electromagnetic means governing the aforesaid means and serving to increase the magnetizing effect due to the said auxiliary field-winding upon an increase in the current of the system, and means whereby the said electromagnet is prevented from operating until the current within the system exceeds a predetermined normal maximum, substantially as described.

In witness whereof I hereunto subscribe my name this 23d day of May, A. D. 1901.

THOMAS DUNCAN.

Witnesses:
GEORGE L. CRAGG,
HERBERT F. OBERGFELL.